(12) United States Patent
Sachdev et al.

(10) Patent No.: US 10,189,227 B2
(45) Date of Patent: Jan. 29, 2019

(54) TAILORED PANEL ASSEMBLY AND METHOD OF MANUFACTURING THE SAME

(71) Applicant: GM GLOBAL TECHNOLOGY OPERATIONS LLC, Detroit, MI (US)

(72) Inventors: Anil K. Sachdev, Rochester Hills, MI (US); Raja K. Mishra, Shelby Township, MI (US); Jon T. Carter, Farmington, MI (US); Tyson W. Brown, Royal Oak, MI (US); Blair E. Carlson, Ann Arbor, MI (US); David R. Sigler, Shelby Township, MI (US); Robert N. Saje, Shelby Township, MI (US); Matthew P. Simonin, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 15/252,878

(22) Filed: Aug. 31, 2016

(65) Prior Publication Data
US 2017/0106625 A1  Apr. 20, 2017

Related U.S. Application Data

(60) Provisional application No. 62/241,307, filed on Oct. 14, 2015.

(51) Int. Cl.
*B21D 26/021* (2011.01)
*B32B 7/02* (2006.01)
(Continued)

(52) U.S. Cl.
CPC .............. *B32B 7/02* (2013.01); *B21D 26/021* (2013.01); *B21D 35/006* (2013.01); *B32B 7/045* (2013.01);
(Continued)

(58) Field of Classification Search
CPC ... B23P 11/00; B23P 2700/00; B23P 2700/50; Y10T 29/49622; Y10T 29/49986
See application file for complete search history.

(56) References Cited

U.S. PATENT DOCUMENTS 3,166,831 A * 1/1965 Keith .................... B29C 44/12
156/79
3,530,029 A * 9/1970 Lemelson ............. B29C 44/306
156/79

(Continued)

FOREIGN PATENT DOCUMENTS

| CN | 102427932 A | 4/2012 |
|----|-------------|--------|
| CN | 103648895 A | 3/2014 |
| JP | 2004306089 A | 11/2004 |

*Primary Examiner* — Jason L Vaughan
*Assistant Examiner* — Amanda J Meneghini
(74) *Attorney, Agent, or Firm* — Quinn IP Law

(57) ABSTRACT

A panel assembly is formed by a plurality of bonds between two sheet materials in a face to face relationship to form a preform. The plurality of bonds define a closed perimeter region between the two sheet materials and an open perimeter region between the two sheet materials. The preform may be formed into a predefined shape. Pressurized fluid is applied through an inlet into the open perimeter region to expand the preform. The pressurized fluid expands the open perimeter region such that the two sheet materials expand in an opposing direction, thereby defining an expanded open perimeter region. The closed perimeter region between the two sheet materials remains vacant of the pressurized fluid such that the closed perimeter region is not expanded. The expanded open perimeter region is filled with a filler material for improving a performance characteristic of the panel assembly, e.g., strength, sound absorption, or stiffness.

14 Claims, 7 Drawing Sheets

(51) Int. Cl.
*B32B 7/04* (2006.01)
*B32B 15/04* (2006.01)
*B32B 15/18* (2006.01)
*B32B 15/20* (2006.01)
*B32B 27/32* (2006.01)
*B21D 35/00* (2006.01)
*B60R 13/02* (2006.01)
*B32B 37/00* (2006.01)

(52) U.S. Cl.
CPC ............ *B32B 15/043* (2013.01); *B32B 15/18* (2013.01); *B32B 15/20* (2013.01); *B32B 27/32* (2013.01); *B32B 37/0076* (2013.01); *B32B 2250/02* (2013.01); *B32B 2307/102* (2013.01); *B32B 2307/41* (2013.01); *B32B 2307/412* (2013.01); *B32B 2307/414* (2013.01); *B32B 2307/50* (2013.01); *B32B 2307/546* (2013.01); *B32B 2307/732* (2013.01); *B32B 2309/105* (2013.01); *B32B 2310/0806* (2013.01); *B32B 2605/00* (2013.01); *B60R 13/02* (2013.01)

(56) References Cited

U.S. PATENT DOCUMENTS

| | | | | |
|---|---|---|---|---|
| 3,668,914 | A | * | 6/1972 | Voitsekhovsky ..... B21D 26/021 413/8 |
| 4,458,516 | A | * | 7/1984 | Naumann ............... B21D 26/02 29/421.1 |
| 5,674,445 | A | | 10/1997 | Van Ert |
| 2002/0042980 | A1 | * | 4/2002 | Seifert ................. B21D 26/021 29/421.1 |

\* cited by examiner

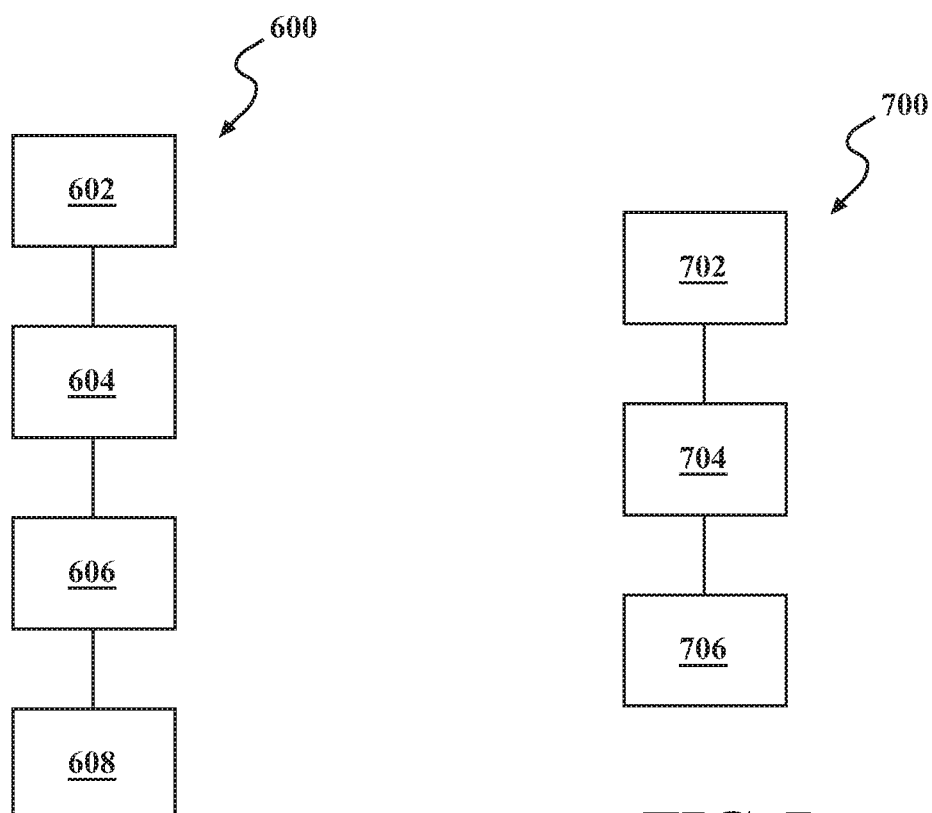

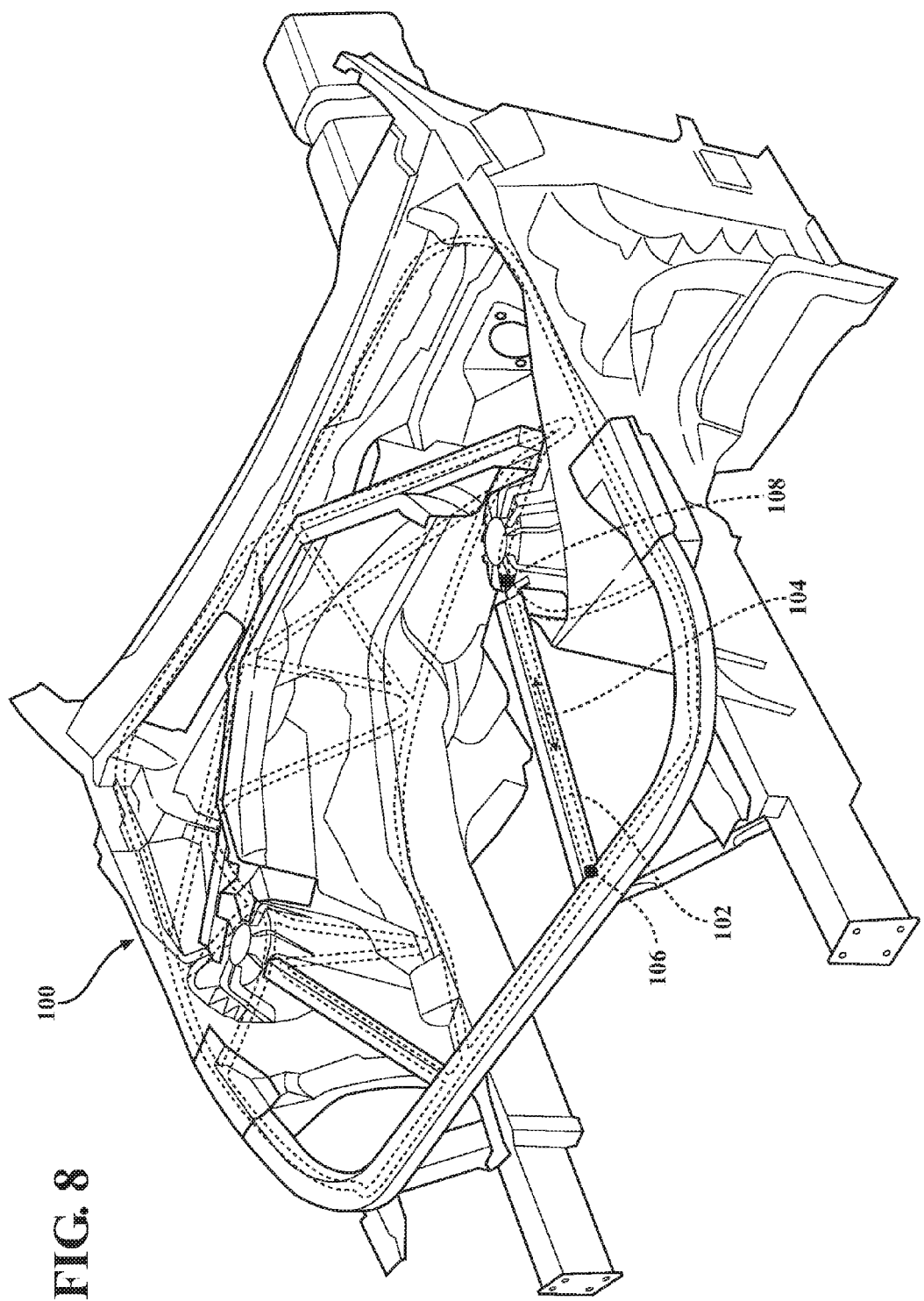

TAILORED PANEL ASSEMBLY AND METHOD OF MANUFACTURING THE SAME

CROSS-REFERENCE TO RELATED APPLICATIONS

This application claims the benefit of U.S. Provisional Patent Application Ser. No. 62/241,307, filed on Oct. 14, 2015, the disclosure of which is hereby incorporated by reference.

TECHNICAL FIELD

The disclosure generally relates to a panel assembly, and a method of forming a panel assembly.

BACKGROUND

Machine components are often comprised of panel assemblies. In some industries, panel assemblies may be generally square or uniform in shape, whereas in other industries specific tailored shapes are desired for a panel assembly. In an automotive example, vehicle panel assemblies may include automotive features, such as an inner panel for a door or a deck lid, a dash panel, a glove box door panel, front-of-trunk panel, and other interior panels. To reduce the mass of the panel assemblies, a lighter density material may be used, or the cross sectional thickness of the panel assemblies may be reduced. Reducing the mass of the panel assemblies may facilitate reducing the overall weight of the machine as a whole. A reduction in the weight of a vehicle, for example, may provide increased efficiency that can be used beneficially in various ways. For example, the speed of the vehicle may be increased with the same power expenditure, or the power may be reduced for the same speed. However, panel assembly fabrication may be subject to structural requirements, such as sound-damping, strength, and/or stiffness requirements, based on overall machine requirements or feature requirements.

SUMMARY

In one aspect of the disclosure, a method of manufacturing a tailored panel assembly is provided. The method includes forming a plurality of bonds between a first sheet material and a second sheet material of a laminated sheet to bond the first and second sheet materials in a face to face relationship to form a preform. The plurality of bonds define a closed perimeter region between the first and second sheet materials and an open perimeter region between the first and second sheet materials. The method also includes forming the preform into a predefined shape of the panel assembly. In addition, the method includes applying a pressurized fluid through at least one inlet coupled in fluid communication with the open perimeter region between the first and second sheet materials of the preform to expand the preform. The pressurized fluid expands the open perimeter region between the first and second sheet materials such that the first and second sheet materials expand in an opposing direction thereby defining an expanded open perimeter region. Furthermore, the closed perimeter region between the first and second sheet materials remains vacant of the pressurized fluid such that the closed perimeter region is not expanded. The method also includes filling the expanded open perimeter region defined between the first and second sheet materials with a non-gaseous filler material, such as but not limited to a sound deadening material, a stiffness controlling material, or a strength controlling material.

A panel assembly is also provided. The panel assembly includes a first sheet material, and a second sheet material bonded to the first sheet material by a plurality of bonds. The plurality of bonds define a closed perimeter region between the first and second sheet materials and an open perimeter region between the first and second sheet materials. A non-gaseous filler material is disposed within the open perimeter region, between the first and second sheet materials. The closed perimeter region between the first and second sheet materials remains vacant of the filler material.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings.

FIG. 6 is flow chart illustrating a method of fabricating the laminated vehicle panel assembly shown in FIG. 5; and FIG. 7 is a flow chart illustrating another method of fabricating the laminated vehicle panel assembly shown in FIG. 5.

FIG. 8 is an illustrative schematic perspective view of a laminated panel assembly configured for an engine compartment of a vehicle, and providing a plurality of defined structural load paths.

DETAILED DESCRIPTION

Figure 1:
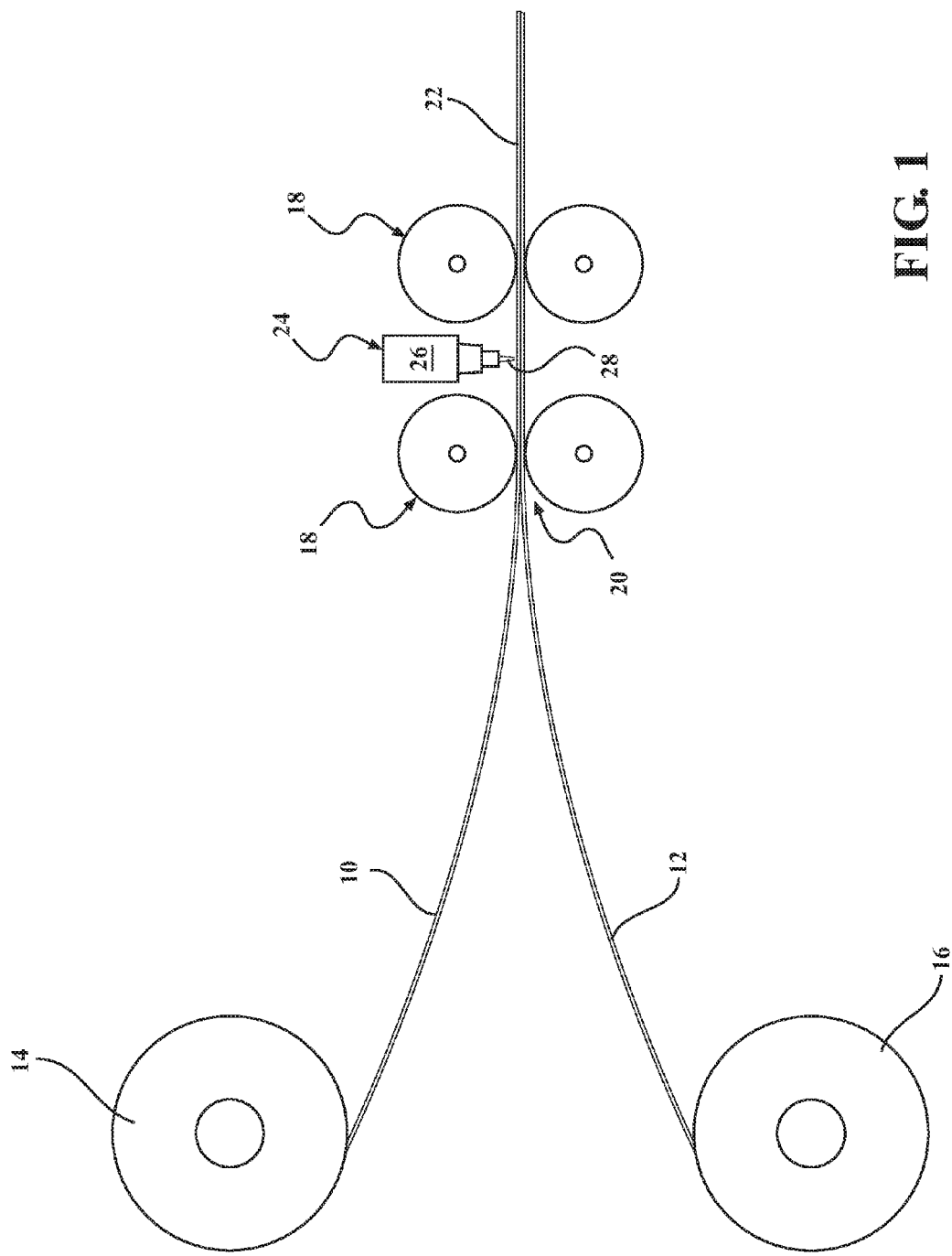
FIG. 1 is an illustrative schematic side view of two sheets of material being fed through a rolling mill and bonded together to form a laminated sheet material.

Referring to the figures, examples of the disclosure provide a tailored panel assembly configured for a reduction in mass. The tailored panel assembly may provide sound-damping capabilities and/or bending stiffness equivalent to or better than might be attained with a monolithic sheet panel. As described herein, the tailored panel assembly may be fabricated from a laminated sheet material that includes a preselected weld pattern defining various open and closed perimeter regions between a first sheet material and a second sheet material. In some examples, the open perimeter regions may be referred to as bubbles, and the laminated sheet material may be referred to as a bubble sheet. In other embodiments, the open perimeter region may be specifically designed to provide a structural load path between a first location on the panel assembly and a second location on the panel assembly. The total thickness of the laminate sheet materials may be less than the thickness of the monolithic sheet. In these examples, a reduced overall thickness at the outer perimeter of the tailored panel assembly may enable the use of sharper hems when coupling the tailored panel assembly to an adjacent structure and/or panel as compared with a thicker monolithic panel that may otherwise be used. Furthermore, the open perimeter regions defined in the panel assembly may be expanded, for example, by fluid pressure, to provide geometric stiffness to the panel assembly. The closed perimeter regions, however, may not be expanded, and may be trimmed, punched, bent, or may define locations utilized for bonding to adjacent structures.

The non-gaseous filler material may be introduced into the expanded regions formed in the panel assembly, or the non-gaseous filler material may be used to form and fill the expanded regions. The non-gaseous filler material may include, but is not limited to, a sound deadening material, a stiffness controlling material, or a strength controlling material, all of which are described in greater detail below. The introduction of the sound-deadening material may facilitate an increased reduction in noise transmitted through the panel assembly as compared to a monolithic panel design. The introduction of the stiffness controlling material or the strength controlling material may facilitate an increase in the strength and/or stiffness of the panel assembly as compared to a monolithic panel design.

For example, one technique in automotive environments for minimizing noise, or acoustic vibrations, which may be transmitted to the interior of a passenger cabin of a vehicle, is to provide panel assemblies with features that damp the acoustic vibrations that may otherwise reach the passenger cabin. These features may facilitate absorbing and/or dissipating vibrational energy. There are many features that may affect the acoustic properties of the sound-damped panel assemblies, including, without limitation, the panel assembly's mass, composition, stiffness, and thickness. In some examples, while reducing the mass of a panel assembly may reduce sound-damping characteristics of the panel assembly, introducing a sound-deadening material to the panel assembly may mitigate any effect on sound transmission due to the reduced mass. Thus, the sound-damped panel assemblies may be optimized for gross geometry to provide the specified level of sound-damping, strength, and/or stiffness while reducing the overall mass of the panel assemblies in these examples.

FIG. 1 is an illustrative schematic side view of two sheets of material, a first sheet material 10 and a second sheet material 12, being fed through a rolling mill 18 and bonded together using a bonding device 24 in a preselected pattern to form a laminated sheet material 22. While the two sheet materials 10, 12 are illustrated in FIG. 1, it is contemplated that any number of sheets may be used to form the laminated sheet material 22. With reference to FIG. 1, the first sheet material 10 and the second sheet material 12 from each of a first coil 14 and a second coil 16, respectively, are brought together and passed simultaneously through the rolling mill 18 with the facing surfaces of the two sheet materials 10, 12 being in face to face contact. As the two sheet materials 10, 12 pass through a roll bite 20, they are bonded together using a bonding device 24 to form the laminated sheet material 22. For example, the sheet materials 10, 12 may be bonded together in select local areas in a preselected pattern that is unique to the panel to be formed. It is contemplated that the rolling mill 18 may perform any desired rolling operation on the two sheet materials 10, 12. For example, without limitation, rolling mill 18 may perform an operation where the rolling mill 18 just bites the two sheet materials 10, 12 to bring them together without a reduction in thickness of the sheet materials, or an operation where the rolling mill 18 reduces the thickness of the sheet materials, as in pack rolling. In the illustrative example, rolling mill 18 includes two sets of rolls; however, it is contemplated that rolling mill 18 may include one or more sets of rolls and may be any type of rolling mill that enables forming the laminated sheet material 22 as described herein.

The sheet materials 10, 12 used to form the laminated sheet material 22 may include various materials. In one example, the sheet materials 10, 12 may be a metallic ferrous or a non-ferrous material suitable for being welded, brazed, and diffusion bonded, for example, without limitation, steel, magnesium, aluminum, titanium, and alloys thereof. One or more of the sheet materials 10, 12 may be coated (e.g., with a brazing compound or other desired coating), especially on the facing surfaces, to facilitate the bonding process. In another example, the sheet materials 10, 12 may be a polymeric or plastic material suitable for being thermally bonded including, for example, polypropylene or polyethylene. Alternatively, the sheet materials 10, 12 may each be fabricated from any other suitable materials that enable the sheet materials 10, 12 to function as described herein, for example, without limitation, composite materials or textiles. It is understood that the first sheet material 10 and the second sheet material 12 may be dissimilar materials. It is also understood that the sheet materials 10, 12 may also be made in any desired color or colors, and may be transparent, translucent, or opaque.

The sheet materials 10, 12 may also include various material thicknesses. For example, the sheet materials 10, 12 may have a thickness in the range between approximately 0.1 millimeters (mm) (0.004 inches (in.)) and approximately 15 mm (0.6 in.). Alternatively, the thickness of the sheet materials 10, 12 may be any dimension that enables the sheet materials 10, 12 to function as described herein. Furthermore, it is understood that the first sheet material 10 and the second sheet material 12 may have different thicknesses and need not be the same thickness to form the laminated sheet material 22.

As the sheet materials 10, 12 exit the rolling mill 18, they are bonded together using the bonding device 24 to form the laminated sheet material 22. This facilitates continuously producing a bonded laminated sheet material 22 directly during rolling of the multiple sheet materials 10, 12. After bonding, the laminated sheet material 22 may be coiled, or pierced and/or blanked (not shown). In one example, after rolling and bonding, the laminated sheet material 22 may be annealed to homogenize the laminated sheet material 22 throughout the material. Annealing facilitates an increase in the material's ductility and reducing its hardness, thereby softening the material and preparing it for further work—such as shaping, stamping, or forming.

In one example, the bonding device 24 includes an energy source 26 that emits electromagnetic radiation in the form of a beam 28 for generating a melt pool (not shown) or for providing enough of a temperature increase to cause local interdiffusion between the sheet materials 10, 12 of the laminated sheet material 22 to cause solid state bonding. In another example, the energy source 26 may emit electromagnetic radiation in the form of a beam 28 for generating bar codes or other markings on the sheet materials 10, 12 of the laminated sheet material 22 to facilitate automatic handling and/or inventorying. In some examples, the bonding device 24 includes more than one energy source 26. For example, without limitation, an alternative bonding device may include a first energy source having a first power and a second energy source having a second power that may be different from the first power, or an alternative bonding device 24 may include at least two energy sources 26 having substantially the same power output. However, the bonding device 24 may include any number and combination of energy sources positioned in any orientation that enables the bonding device 24 to operate as described herein. Furthermore, the energy source 26 may be any energy source suitable for generating the melt pool (not shown) in the laminated sheet material 22, for example, without limitation, an energy source for generating a laser beam, an electron beam, a plasma beam, a welding arc, or a hybrid energy source such as a laser/arc. In one particular example, the energy source 26 is a laser device that generates a concentrated beam of coherent, monochromatic light for laser welding.

Figure 2:
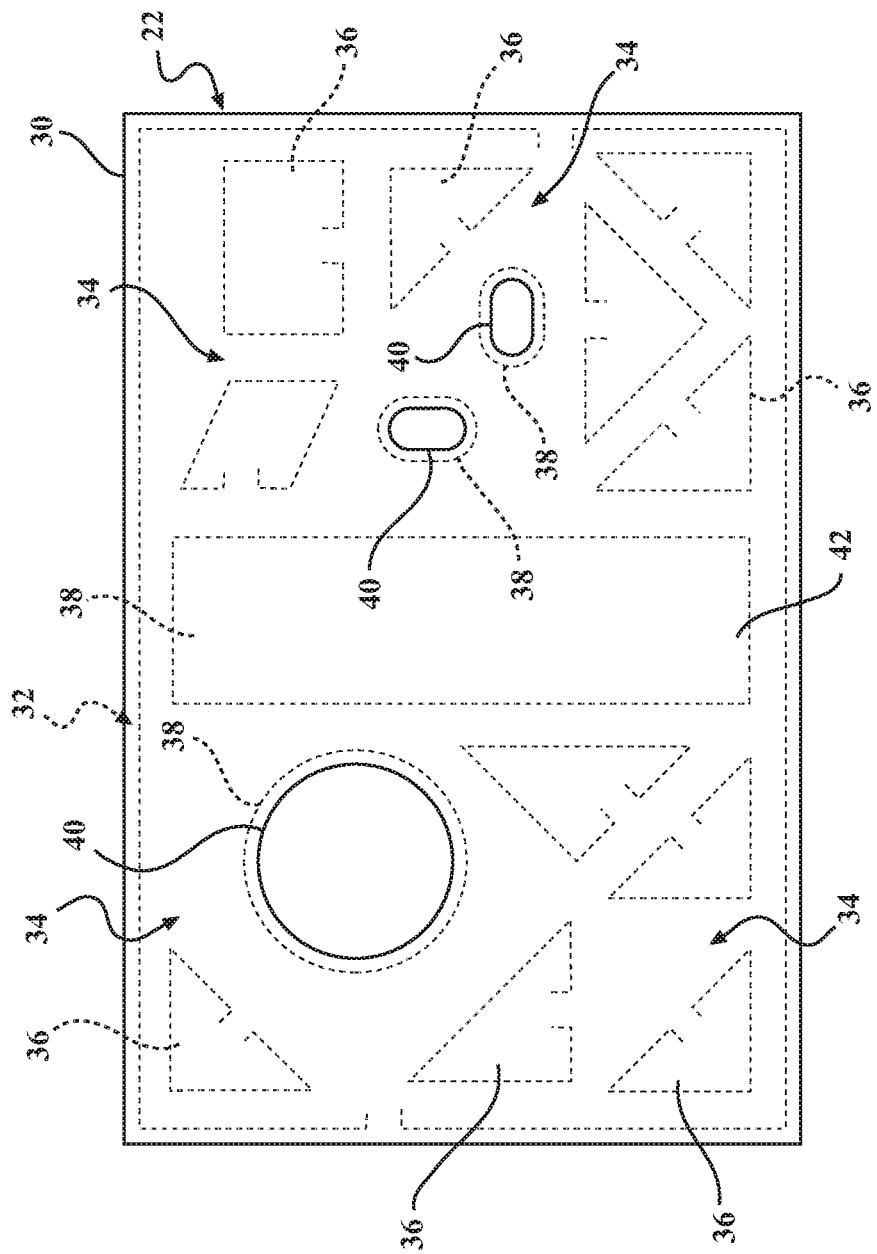
FIG. 2 is an illustrative schematic top view of a preform created from the laminated sheet material of FIG. 1 illustrating an example bond pattern formed by a bonding device.

FIG. 2 is an illustrative schematic top view of a preform 30 created from the laminated sheet material 22 illustrating an example bond pattern 32 (dashed lines) formed by bonding device 24. In this example, the energy source 26 is a laser device and the bond pattern 32 is laser welded, comprising a series of laser welds. Laser welding, as described herein, is the joining of facing surfaces of the sheet materials 10, 12 by applying laser energy to the sheet materials 10, 12 so that the adjoining surfaces are merged into each other. As shown in FIG. 1, after the sheet materials 10, 12 have been rolled together in a stack, the energy source 26 is used to weld the sheet material 10 to a face of sheet material 12. In one example, the weld depth in the laminated sheet material 22 may be controlled so as to bond the sheet materials 10, 12 together in a preselected bond pattern 32 without penetrating through the sheet materials 10, 12. That is, the depth of the weld may be controlled so that at any one bond the weld does not penetrate the distant face of the adjoining sheet, as this may interfere with the proper formation of the tailored panel assembly 46. In another illustrative embodiment, the depth of the weld may be controlled to enable full penetration, such as to trim panel openings in one example.

The bonding device 24 applies a preselected bond pattern 32 to form the laminated sheet material 22. In this process, a pattern of the passageways 34 defined by open perimeter regions 36 and closed perimeter regions 38 is applied onto the laminated sheet material 22. The passageways 34 and the open perimeter regions 36 are configured to be expanded, i.e., the sheet materials 10, 12 are expanded in an opposing direction, using a pressurized fluid. The pressurized fluid may include a liquid or a gas. The open perimeter regions 36 and/or the passageways 34 may be shaped, sized and/or configured to define a structural load path for transmitting a force between a first location and a second location of the panel assembly 46. The closed perimeter regions 38, however, are configured to create sealed areas within the closed perimeter regions 38. In one example, the sealed areas within the closed perimeter regions 38 may be punched, pierced, or cut to create holes 40 through the preform 30. Alternatively, or in addition to, the sealed areas within the closed perimeter regions 38 may define areas 42 for bends or for bonding to adjacent structures after completion of the laminated vehicle panel assembly. The openings defining the open perimeter regions 36, especially at an edge of the preform 30, may be used as injection and/or extraction/venting locations of the pressurized fluid.

It is contemplated that the preselected bond pattern 32 is tailored to the particular panel being formed and that any combination of the passageways 34, the open perimeter regions 36, and the closed perimeter regions 38 may be used to meet specific requirements for the panel being formed. For example, without limitation, the preselected bond pattern 32 may define one or more isolated regions in the preform 30. In one example, a tailored panel assembly 46 (shown in FIG. 4), may require stiffness in one portion of the panel assembly, and stiffness with sound damping in another portion of the panel assembly. The preselected bond pattern 32 may define two isolated regions with the tailored panel assembly 46 to address the specific design requirements. As an illustrative example, a first isolated region may be tailored to increase stiffness, while a second isolated region is tailored to incorporate sound-dampening material for additional mitigation of sound transmission.

Figure 3:
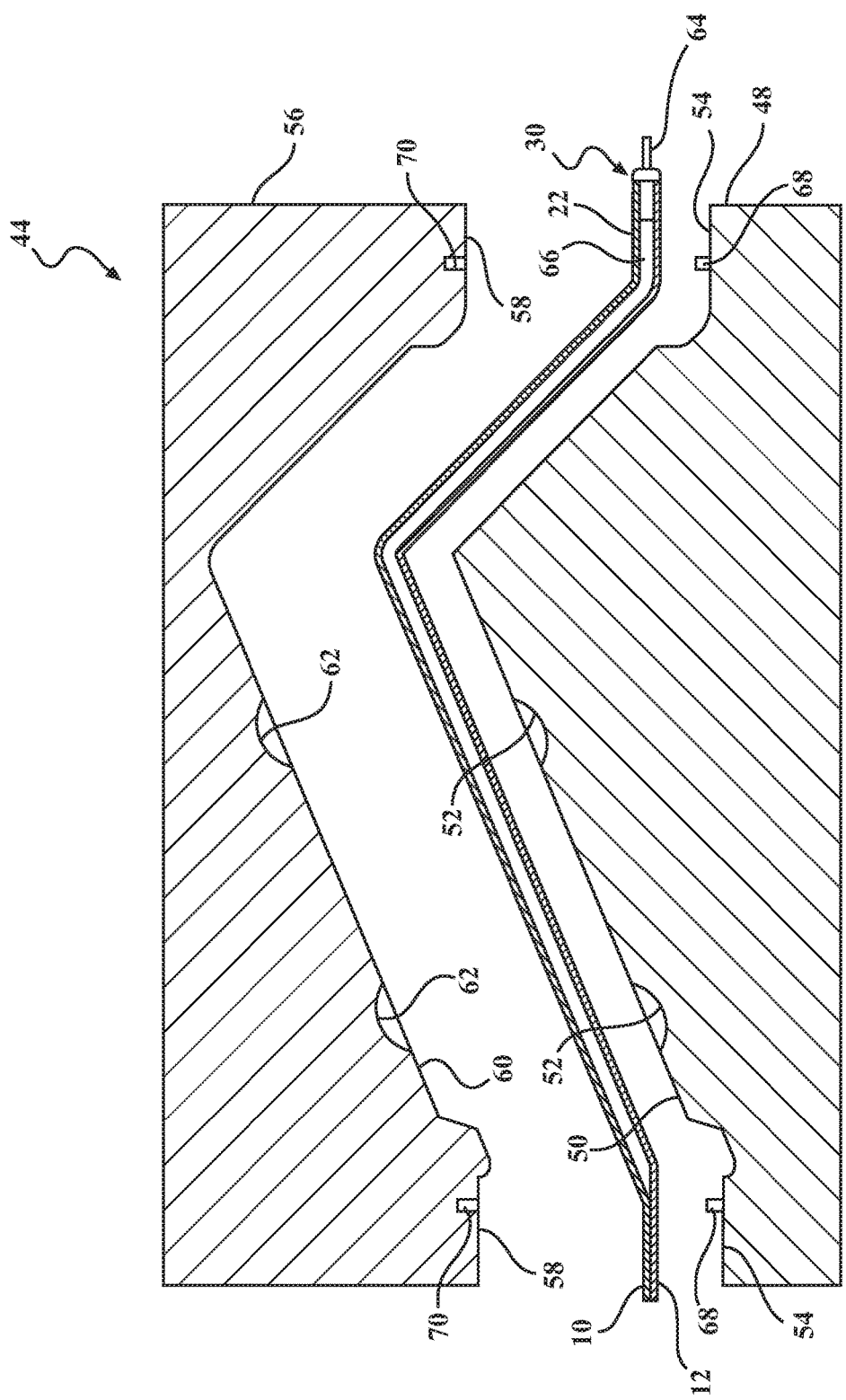
FIG. 3 is an illustrative schematic side cross sectional view of a die, or forming tool for forming the preform of FIG. 2 into a laminated vehicle panel assembly.
Figure 4:
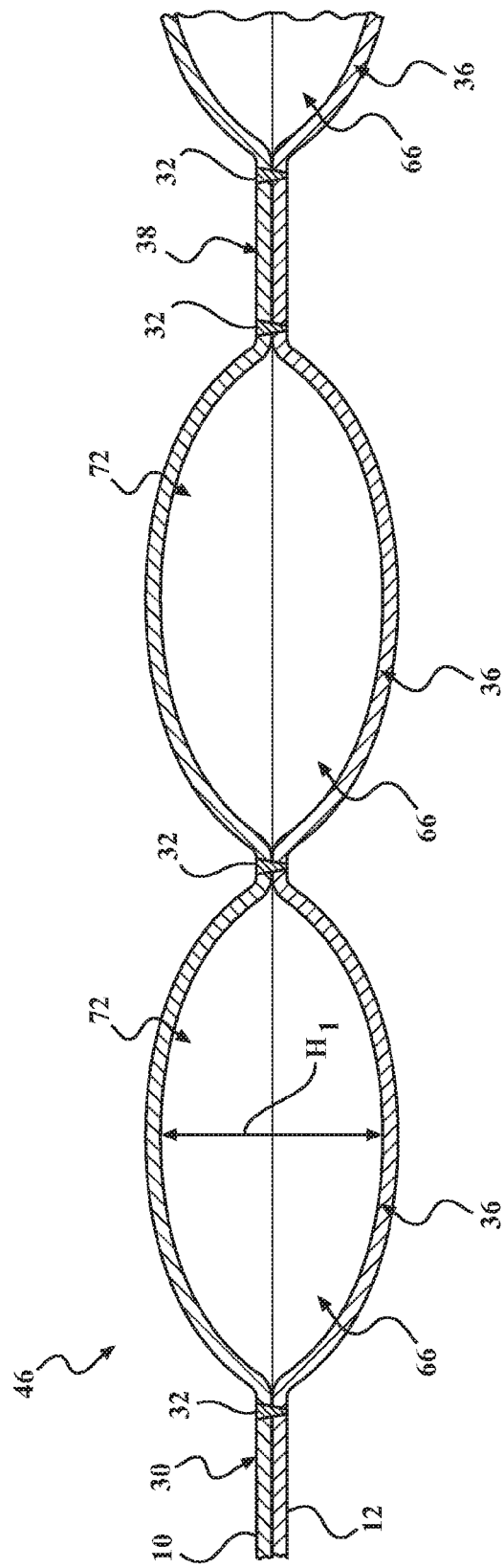
FIG. 4 is an illustrative schematic sectional view of a portion of a laminated vehicle panel assembly shown in FIG. 5.

FIG. 3 is an illustrative schematic side view of a die, or forming tool 44 for forming preform 30 into a tailored panel assembly 46 (shown in FIG. 4). In this example, preform 30 is formed (e.g., stamped, stretch formed, etc.) from the flat laminated sheet material 22 into the shape of the tailored panel assembly 46. A lower tool half 48 includes a forming surface 50 that defines a back side of the laminated vehicle panel assembly 46. Optionally, in one example, formed in forming surface 50 are cavities 52 that have a perimeter (not shown) that corresponds to the open perimeter regions 36 defined in the preform 30. The periphery 54 of the lower tool half 48 has a flat surface for clamping and sealing a peripheral portion of the preform 30. An upper tool half 56 is complementary in shape to the lower tool half 48. A periphery 58 of the upper tool half 56 is a flat surface for clamping and sealing the peripheral portion of the preform 30. The upper tool half 56 includes a forming surface 60 that optionally includes cavities 62. In one example the cavities 62 correspond to cavities 52 in the lower forming tool 48.

Referring to FIG. 3, a fluid inlet/outlet tube 64 is provided for directing a forming fluid into/out of an interior 66 of the preform 30. The interior 66 is defined by the open perimeter regions 36 formed in the laminated sheet material 22, or preform 30. The fluid inlet/outlet tube 64 is disposed between the sheet materials 10, 12 of the preform 30 to provide fluid communication between a source of pressurized fluid (not shown) and the interior 66 of the preform 30. In FIG. 3, only one fluid inlet/outlet tube 64 is shown; however, it is contemplated that any number of fluid inlet/outlet tubes may be included that enable the injection/extraction of the pressurized fluid. In other examples, including examples having more than two sheet materials, an inlet/outlet tube 64 may be placed between one or more different layers of the sheet materials. In addition, more than one fluid inlet/outlet tube may be used, for example to introduce different fluids or fluid amounts to different areas of a sheet.

With reference to FIG. 3, in one example, fluid pressure may be applied to the interior 66 of the preform 30 during the forming of the tailored panel assembly 46. For example, without limitation, the fluid pressure may be applied: while the preform 30 is closed within the forming tool 44; after the forming tool 44 formed preform 30 and the forming tool 44 is opened a preselected amount (e.g., in the range between about 0.5 mm (0.02 in.) and about 50 mm (1.97 in.)); or prior to complete closure of the forming tool 44, where the fluid pressure may be utilized to expand the preform 30 until contact with the forming tool 44 is achieved. In another example, the fluid pressure may be applied to the interior 66 of the preform 30 after forming of the tailored panel assembly 46 and removal from the forming tool 44.

In one example operation, the preform 30 is positioned in the forming tool 44. The size and shape of the resultant tailored panel assembly 46 are limited by the dimensions of the forming tool 44 and the preform 30. The lower tool half 48 and the upper tool half 56 are brought together under force, such as, for example, by use of a hydraulic press. As shown in FIG. 3, the forming tool 44 may also include tooling pins 68 and corresponding mating slots 70 to assist in aligning the upper tool half 56 and lower tool half 48 of the forming tool 44 during closure.

While the forming tool 44 is being fully closed, the preform 30 is being formed into the shape of the laminated vehicle panel assembly 46. After the tailored panel assembly 46 is formed, the forming tool 44 is opened and the panel assembly is removed. The fluid inlet/outlet tube 64 is placed between the sheet materials 10, 12, and a pressure differential is created between the interior 66 and exterior of the preform 30. The pressure differential may be generated by injecting a forming fluid (not shown), for example, without limitation, argon, nitrogen, compressed air, or other suitable fluids, through the fluid inlet/outlet tube 64. This increases the forming fluid pressure within the interior 66 of the preform 30. As a result, as shown in FIG. 4, the preform 30 expands in the open perimeter regions 36 to create cavities 72 between the sheet materials 10, 12 of the tailored panel assembly 46.

In another example operation, the preform 30, with the fluid inlet/outlet tube 64 placed between the sheet materials 10, 12, is positioned in the forming tool 44. The lower tool half 48 and the upper tool half 56 are brought together under force, such as, for example, by use of a hydraulic press. The forming tool 44 includes a seal defined by the periphery 54 of the lower tool half 48 and the periphery 58 of the upper tool half 56 to facilitate in maintaining a fluid-tight seal when the forming tool 44 is closed.

While the forming tool 44 is being fully closed, the preform 30 is being formed into the shape of the tailored panel assembly 46. After the forming tool 44 is fully closed, a pressure differential is created between the interior 66 and exterior of the preform 30. The pressure differential may be generated by injecting a forming fluid (not shown), for example, without limitation, argon, nitrogen, compressed air, or other suitable fluids, through the fluid inlet/outlet tube 64. This increases the forming fluid pressure within the interior 66 of the preform 30. As a result, the preform 30 expands and fills one or more of optional cavities 52, 62 of the forming tool 44, thereby creating cavities 72, having a predefined shape, between the sheet materials 10, 12 of the tailored panel assembly 46.

In one alternative example, with reference to FIG. 3, the sheet materials 10, 12 may be formed together in the forming tool 44 into a desired panel shape. The two sheet materials 10, 12 may then be bonded together to create the tailored panel assembly 46 (such as shown in FIG. 4). For example, without limitation, the bonding device 24 (such as shown in FIG. 1) may be used to bond the formed sheet material 10 to the face of the formed sheet material 12. The bonding device 24 applies a preselected bond pattern (e.g., the bond pattern 32 shown in FIG. 2) to form the tailored panel assembly 46. It is noted that the sheet materials 10, 12 may be formed into the desired panel shape using any sheet metal forming process that enables the sheet materials 10, 12 to function as described herein. For example, the sheet materials 10, 12 may be formed using drawing, stretch forming, hydroforming, superplastic forming, fine blanking, electromagnetic forming, high energy rate forming (explosive forming), and the like.

After forming and bonding the sheet materials 10, 12 to create the tailored panel assembly 46 (such as shown in FIG. 4), the fluid inlet/outlet tube 64 may be placed between the sheet materials 10, 12, and a pressure differential created between the interior and exterior of the tailored panel assembly 46. The pressure differential may be generated by injecting a forming fluid (not shown), for example, without limitation, argon, nitrogen, compressed air, or other suitable fluids, through the fluid inlet/outlet tube 64. This increases the forming fluid pressure within the interior of the tailored panel assembly 46. As a result, as shown in FIG. 4, the tailored panel assembly 46 expands in the open perimeter regions 36 to create cavities 72 between the sheet materials 10, 12 of the tailored panel assembly 46.

FIG. 4 is an illustrative schematic sectional view of a portion of the tailored panel assembly 46. As shown, the cavities 72 may be formed between bonds of the preselected bond pattern 32. The bonds facilitate constraining the cavities 72 to the defined open perimeter regions 36. As shown in FIG. 4, the closed perimeter region 38 is not expanded due to the closed perimeter bond of the preselected bond pattern 32 preventing the forming fluid from entering the closed perimeter region. The cavities 72 have a height $H_1$ in the range between approximately 0.1 mm (0.004 in.) and approximately 50 mm (1.97 in.), in one example. Alternatively, height $H_1$ may be any dimension that enables the cavities 72 to function as described herein.

In addition, the perimeter shape of the open perimeter regions 36 may be any preselected shape and size that enables the tailored panel assembly 46 to function as described herein. Furthermore, the expanded shape of the cavities 72 may generally be non-uniform because of the different sizes and shapes of the preselected bond pattern 32; however, the cavities 72 will generally expand in a generally spherical shape when expanded outside of the forming tool 44 (such as shown in FIG. 3). When formed within forming tool 44, the cavities 72 take on the shape of one or more of the optional cavities 52, 62 (shown in FIG. 3) defined within the forming tool 44.

In one example embodiment, the cavities 72 are filled with a gas, such as argon, nitrogen, compressed air, or other suitable gasses. The gases are injected under high pressure to facilitate forming the cavities 72. In another example, the cavities 72 may be filled with a non-gaseous filler material, such as but not limited to an insulating material, a sound deadening material, a stiffness controlling material, or a strength controlling material. The insulating and/or sound-deadening material may include for example, without limitation, various polymers, polymer composites, plastisols, syntactic sound attenuating materials (i.e., materials containing microspheres), and the like. In one example, the sound-deadening material may be a material that expands based on a chemical reaction in the sound-deadening material. For example, without limitation, the chemical reaction may have a delay before causing the sound-deadening material to expand, or require an additional process, such as heating, to activate the reaction causing the sound-deadening material to expand. In such embodiments, the sound-deadening material may be introduced into the cavities 72 after the cavities are formed. In another example, a heat-insulting material may be introduced into cavities 70 such that the tailored panel assembly 46 provides thermal insulation. It is contemplated that in some examples of the tailored panel assembly 46 that include more than two sheet material layers, a heat-insulating material may be disposed between a first set of sheet materials, and a sound-deadening material may be disposed between a second set of sheet materials. Alternatively, any combination of heat-insulating material and sound-deadening material may be disposed between any number of sheets materials that enable the tailored panel assembly 46 to function as describe herein.

As noted above, the non-gaseous filler material may include a strength and/or stiffness controlling material. For example, the non-gaseous filler material may include one of a super saturated solution, an electrorheological fluid, or a magnetorheological fluid. As is known by those skilled in the art, a super saturated solution is a state of a solution that contains more of a dissolved material than could be dissolved by the solvent under normal circumstances. Super saturated solutions may also undergo solidification under specific conditions, or in response to a specific stimuli. The solidification process is not reversible. As is known to those skilled in the art, Electrorheological (ER) fluids are suspensions of extremely fine non-conducting but electrically active particles (up to 50 micrometer diameter) in an electrically insulating fluid. The apparent viscosity of these fluids changes reversibly by an order of up to 100,000 in response to an electric field. Accordingly, the apparent viscosity of ER fluids may be changed and/or controlled in response to an applied electric field. As is known in the art, magnetorheological fluids (MR fluids) are a type of smart fluid in a carrier fluid, usually a type of oil. When subjected to a magnetic field, the fluid greatly increases its apparent viscosity, to the point of becoming a viscoelastic solid. Importantly, the yield stress of the fluid when in its active ("on") state can be controlled very accurately by varying the magnetic field intensity. The upshot is that the fluid's ability to transmit force can be controlled with an electromagnet.

The non-gaseous filler material may be controlled using a control signal, to change a physical property of the filler material between a first state and a second state. For example, if the filler material includes an ER fluid or a MR fluid, then the apparent viscosity of the ER fluid or the MR fluid may be controlled with an electric or magnetic field respectively. The application of the control signal, for example an electric or magnetic field, may be controlled by a vehicle controller. The vehicle controller may signal the filler material, with the control signal, to change between the first state and the second state. For example, the vehicle controller may vary the control signal to cause the filler material to change its apparent viscosity between a first viscosity and a second viscosity. In so doing the performance, such as damping or load carrying capacity, of the panel assembly 46 may be controlled and/or changed for certain situations.

Referring to FIG. 8, a panel assembly 100 is embodied as an engine compartment for a vehicle. The panel assembly 100 is designed to have multiple open perimeter regions 36, which each provide a structural load path between a first location and a second location. For example, a first region 102 provides a structural load path 104 between a first location 106 and a second location 108. While on the first region 102 is specifically shown and described herein, it should be appreciated that the panel assembly 100 may include several other open regions that form different load paths between different locations on the panel assembly 100.

The first region 102 is filled with a non-gaseous filler material, such as described above. For example, the first region 102 may be filled with a super saturated solution, that once activated with a control signal, solidifies to form a solid crystalline structure within the open region 102, thereby increasing the stiffness and/or strength of the panel assembly 102, and providing the structural load path 104 between the first location 106 and the second location 108. As noted above, the solidification process of the super saturated solution is not reversible. Accordingly, if the filler material is a super saturated solution, then once the super saturated solution is solidified, the filler material may no longer be controlled. In contrast, the first region 102 may be filled with an ER or MR fluid, this is repeatable controllable or variable.

If the first region 102 is filled with a filler material such as an ER fluid or a MR fluid, then the vehicle controller may continuously apply and/or alter a control signal to change a physical property of the ER fluid or the MR fluid, e.g., the apparent viscosity. For example, if the first region is filled with a MR fluid, the vehicle controller may apply the control signal to change the apparent viscosity of the MR fluid within the first region 102 between a fluid state and a viscoelastic solid. When controlled to be a fluid, the MR fluid may act as a damping fluid. When controlled to be a viscoelastic solid, the MR fluid may increase the strength and/or stiffness of the panel assembly 100, and provide the structural load path 104 between the first location 106 and the second location 108. It should be appreciated that the apparent viscosity of the MR fluid may be controlled to other viscosities to control the amount of force that the load path 104 may transmit, the stiffness of the panel assembly 100, and/or the amount of damping. It should be appreciated that an ER fluid may be controlled in a similar manner.

In one example, with reference to FIGS. 3 and 4, to facilitate filling of the cavities 72 with the non-gaseous filler material, the cavities 72 may have a negative pressure applied. For example, the tailored panel assembly 46 may include two inlet/outlet tubes 64, one for injecting the non-gaseous filler material, and one for extracting the pressurized fluid used to initially form the cavities 72 (e.g., air) to facilitate drawing the non-gaseous filler material into the cavities 72. It is contemplated that the tailored panel assembly 46 may include any number of inlet/outlet tubes 64, positioned anywhere on the tailored panel assembly 46 and in fluid communication with the cavities 72 to enable the non-gaseous filler material to be drawn into the cavities 72.

In an alternative example, the non-gaseous filler material may be injected directly into the interior 66 of the laminated sheet material 22 under pressure to expand the laminated sheet material 22, thereby forming the cavities 72, and filling them with the non-gaseous filler material. In another example, the non-gaseous filler material may be injected into the interior 66 of the laminated sheet material 22 where a chemical reaction causes the non-gaseous filler material to expand, thereby providing the necessary pressure to expand the laminated sheet material 22, forming the cavities 72, and filling them with the non-gaseous filler material.

Figure 5:
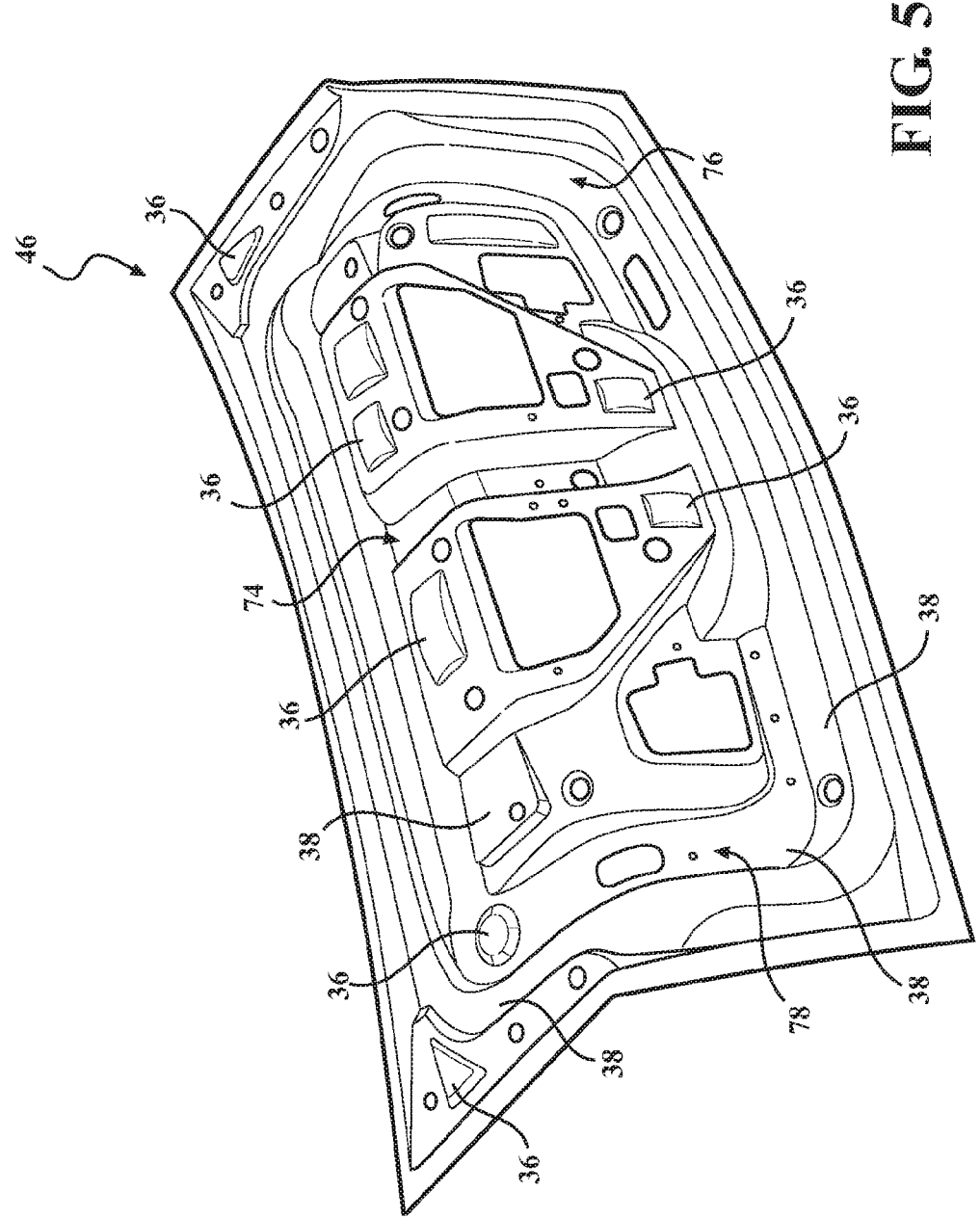
FIG. 5 is an illustrative schematic perspective view of the example laminated vehicle panel assembly after removal from the forming tool and inflation of the cavities.

FIG. 5 is an illustrative schematic view of an example tailored panel assembly 46 after removal from the forming tool 44, trimming excess material, piercing holes, and inflation of cavities 72. In this illustrative example, the tailored panel assembly 46 is an automobile decklid inner panel. Alternatively, tailored panel assembly 46 may include, but is not limited to, any automotive panel that enables tailored panel assembly 46 to function as described herein, such as an A-pillar, a B-pillar, an inner panel for a door, a dash panel, a glove box door panel, other interior panels. In other examples, tailored panel assembly 46 may be a structural component, semi-structural component, bracket, support, etc. It should further be appreciated that the tailored panel assembly may be a component of a machine used in industries other than the automotive industry.

In this example, tailored panel assembly 46 is of a complex shape having curvature across the width of the decklid and including various recessed regions, for example, recessed regions 74, 76, and 78. In addition, the laminated vehicle panel assembly 46 includes open perimeter regions 36 defining cavities 72 (shown in FIG. 4) and closed perimeter regions 38. The open perimeter regions 36 and the closed perimeter regions 38 may be predetermined to facilitate increasing the strength and/or stiffness of tailored panel assembly 46, such as described above with reference to the panel assembly 100 shown in FIG. 8.

FIG. 6 is a flow chart illustrating exemplary operations of fabricating a tailored panel assembly 46, 100. The method 600 is described herein with respect to fabricating the preform 30 and the tailored panel assembly 46 shown in FIGS. 1-5. A plurality of bonds may be formed at operation 602 between the sheet material 10 and the sheet material 12 of the laminated sheet material 22. This facilitates bonding the sheet materials 10, 12 in a face to face relationship to form the preform 30. The plurality of bonds define the closed perimeter regions 38 and the open perimeter regions 36 between the sheet materials 10, 12. The preform 30 may be formed at operation 604 into the predefined shape of the tailored panel assembly 46. A pressurized fluid (not shown) is applied at operation 606 through the inlet to the preform 30. The inlet is coupled in fluid communication with the open perimeter regions 36 between the sheets 34 of the preform 30 to expand the preform 30. The pressurized fluid expands the open perimeter regions 36 between the sheet materials 10, 12 such that the sheet materials 10, 12 expand in an opposing direction, thereby defining the cavities 72. The closed perimeter regions 38 defined between the sheets remain vacant of the pressurized fluid such that the closed perimeter regions 38 are not expanded. The cavities 72 are filled at operation 608 with a non-gaseous filler material (not shown).

The exemplary operations presented in FIG. 6 are not intended to provide any limitations on the order or manner of steps or operations implemented in the panel assembly fabrication process. Any number of suitable alternatives may be performed during the panel assembly fabrication process to facilitate increasing the panel assembly's sound-deadening, stiffness, and strength characteristics. For example, the laminated sheet material 22 may be cold worked in a rolling mill, annealed, and formed in a forming toll or die.

FIG. 7 is a flow chart illustrating exemplary operations of fabricating the tailored panel assembly 46, 100. The method 700 is described herein with respect to fabricating the preform 30 and the tailored panel assembly 46 shown in FIGS. 1-5. The laminate preform 30 is formed at operation 702 into a predefined shape of the tailored panel assembly 46. The laminate preform 30 includes a sheet material 10 and a sheet material 12 bonded together in a face to face relationship. The laminate preform 30 is expanded at operation 704 to form an array of cavities 72 between the sheet materials 10, 12. The location and size of the cavities 72 are varied spatially at operation 706 to facilitate increasing one or more of the sound-damping, strength, or stiffness characteristics of the tailored panel assembly 46.

The exemplary operations presented in FIG. 7 are not intended to provide any limitations on the order or manner of steps or operations implemented in the panel assembly fabrication process. Any number of suitable alternatives may be performed during the panel assembly fabrication process to facilitate increasing the panel assembly's sound-deadening, stiffness, and strength characteristics. For example, a closed perimeter region 38 may be provided in the laminate preform 30. The closed perimeter region 38 may define an area in the tailored panel assembly 46 to be punched to create a hole through the preform 30.

As used herein, the singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, example ranges described may be combined and/or interchanged; such ranges are identified and include all the sub-ranges contained therein unless context or language indicates otherwise.

The apparatus, system, and methods described herein facilitate reducing the mass associated with a panel assembly while addressing component requirements such as stiffness, sound-damping, or strength. Furthermore, the configurations of the panel assembly facilitate damping acoustic vibrations that may be transmitted via a panel assembly, such as to the passenger compartment of a vehicle in an automotive example. In addition, the configurations of the panel assembly may provide a tailored panel assembly configured for a reduction in mass while providing sound-damping capabilities and bending stiffness equivalent to or better than might be attained with a monolithic sheet panel. By reducing the mass of the panel by using a laminated panel assembly, the weight of the panels may be substantially reduced, while providing increased sound-deadening and stiffness properties.

The apparatus and methods described herein are not limited to the specific examples described herein. For example, components of each apparatus and method may be utilized independently and separately from other components described herein. For example, the apparatus and methods may also be used in combination with other panel systems, and are not limited to practice in any particular industry. Rather, the illustrative examples may be implemented and utilized in connection with many other applications and industries.

Although specific features of various illustrative examples of the disclosure may be shown in some drawings and not in others, this is for convenience only. In accordance with the principles of the disclosure, any feature of a drawing may be referenced and/or claimed in combination with any feature of any other drawing.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of manufacturing a panel assembly, the method comprising:
    forming a plurality of bonds between a first sheet material and a second sheet material of a laminated sheet to bond the first and second sheet materials in a face to face relationship to form a preform, the plurality of bonds defining a closed perimeter region between the first and second sheet materials and an open perimeter region between the first and second sheet materials, wherein the open perimeter region is formed to define a structural load path for transmitting a force between a first location of the panel assembly and a second location of the panel assembly;

forming the preform into a predefined shape of the panel assembly;

applying a pressurized fluid through at least one inlet coupled in fluid communication with the open perimeter region between the first and second sheet materials of the preform to expand the preform, wherein the pressurized fluid expands the open perimeter region between the first and second sheet materials, wherein the first and second sheet materials expand in an opposing direction thereby defining an expanded open perimeter region, and wherein the closed perimeter region between the first and second sheet materials remains vacant of the pressurized fluid such that the closed perimeter region is not expanded; and filling the expanded open perimeter region defined between the first and second sheet materials with a non-gaseous filler material.

2. The method of claim 1 further comprising positioning the preform in a die comprising a cavity having a predefined bubble shape with a perimeter that conforms to the open perimeter region defined in the preform.

3. The method of claim 2, wherein applying the pressurized fluid comprises:

positioning a fluid inlet tube in the at least one inlet; and injecting the pressurized fluid into the open perimeter region between the first and second sheet materials of the preform through the fluid inlet tube to increase the pressure inside the preform, wherein the open perimeter region defined in the preform expands to conform to the cavity of the die.

4. The method of claim 2, wherein the plurality of bonds define a second open perimeter region between the first and second sheet materials, the second open perimeter region being in fluid communication with the first open perimeter region, wherein the die further comprises a second cavity having a second predefined bubble shape, and further comprising:

injecting the pressurized fluid into the second open perimeter region to increase the pressure inside the preform so that the second open perimeter region expands to conform to the second cavity of the die.

5. The method of claim 1, wherein forming the preform further comprises forming the preform into the predefined shape in a stamping press.

6. The method of claim 1, wherein forming the preform further comprises punching a hole through the preform within the closed perimeter region between the first and second sheet materials.

7. The method of claim 1, wherein forming the plurality of bonds further comprises forming the plurality of bonds using one or more of a brazing, welding, thermal bonding, or diffusion bonding process.

8. The method of claim 1, wherein filling the expanded open perimeter region further comprises extracting the pressurized fluid through at least one outlet coupled in fluid communication with the open perimeter region between the first and second sheet materials of the preform.

9. The method of claim 8, wherein extracting the pressurized fluid comprises:

positioning a fluid outlet tube in the at least one outlet; and extracting the pressurized fluid from the open perimeter region between the first and second sheet materials of the preform through the fluid outlet tube to decrease the pressure inside the preform to facilitate drawing the filler material into the expanded open perimeter region.

10. The method of claim 1 further comprising rolling the first and second sheet materials together in a rolling mill to form the laminated sheet, wherein the rolling mill bites the first and second sheet materials to bring them together in face to face contact without reducing the thickness of the first and second sheet materials.

11. The method of claim 1 further comprising:

providing the first and second sheet materials in two respective strips of material;

bringing facing surfaces of the first and second sheet materials into contact; and pack rolling the first and second sheet materials to form the laminated sheet.

12. The method of claim 1, further comprising signaling the filler material to change a physical property between a first state and a second state.

13. The method of claim 12, wherein signaling the filler material to change the physical property includes sending a control signal from a vehicle controller to the filler material.

14. The method of claim 1, wherein the filler material is one of a sound deadening material, a stiffness controlling material, or a strength controlling material.

* * * * *